UNITED STATES PATENT OFFICE.

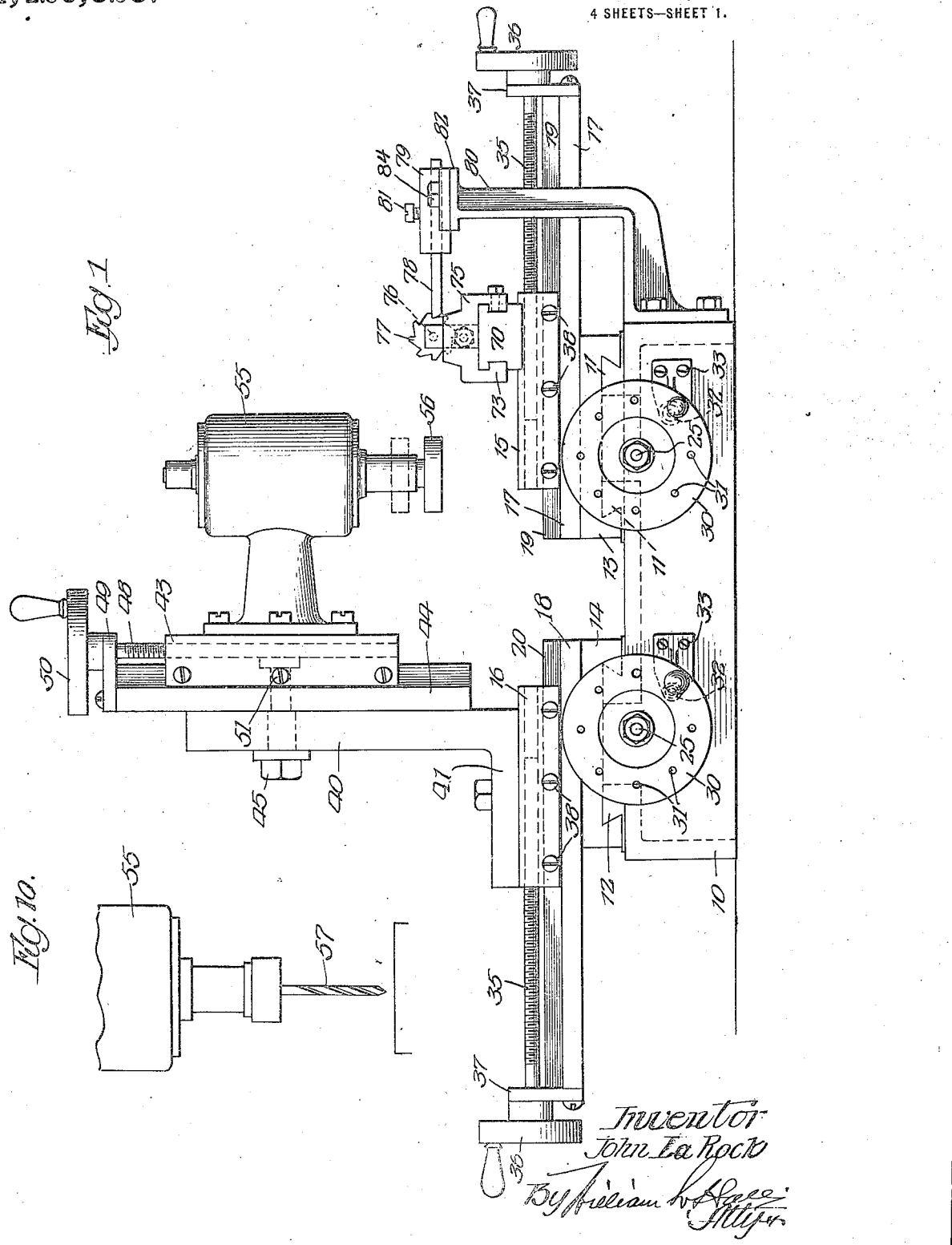

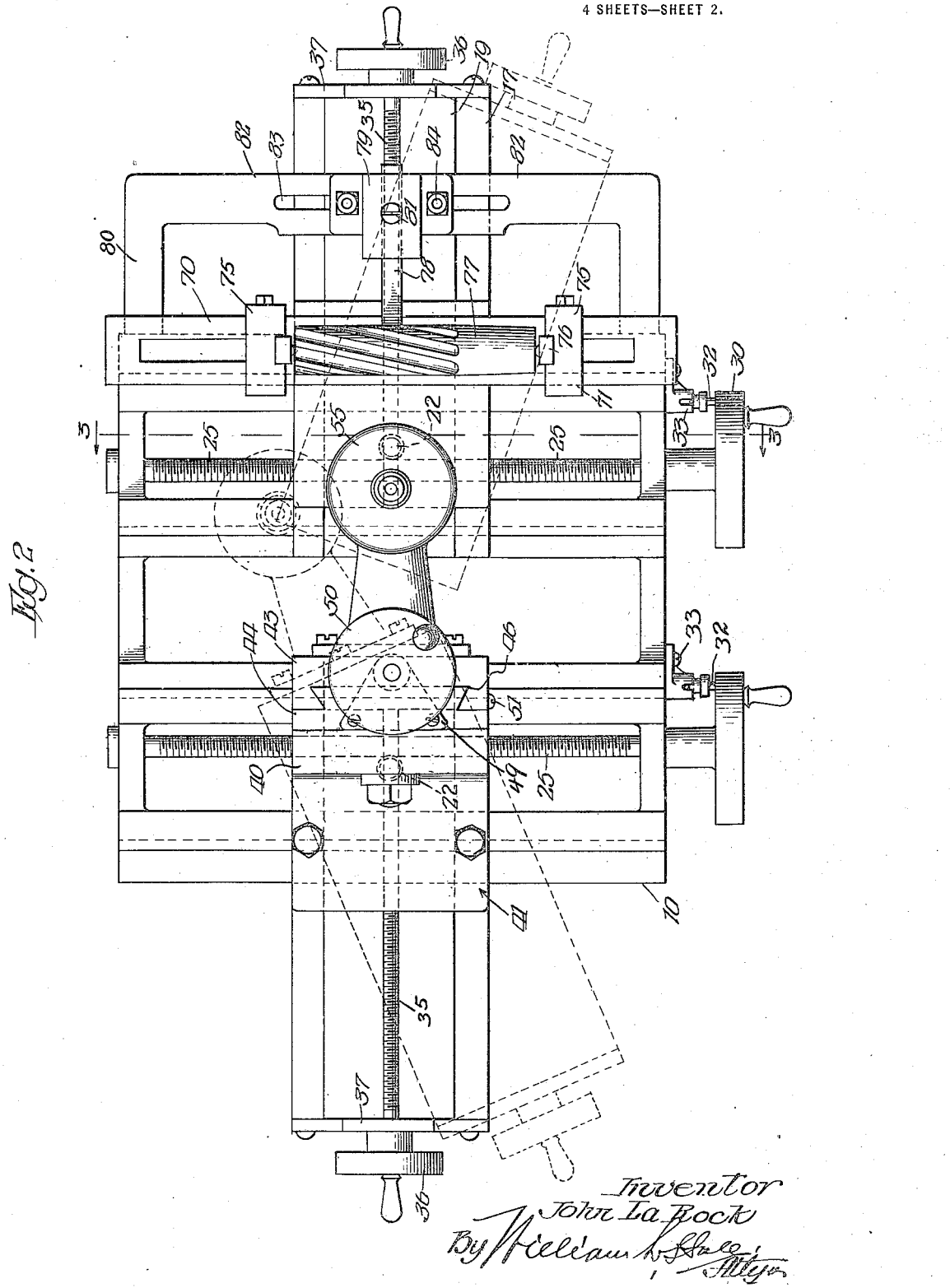

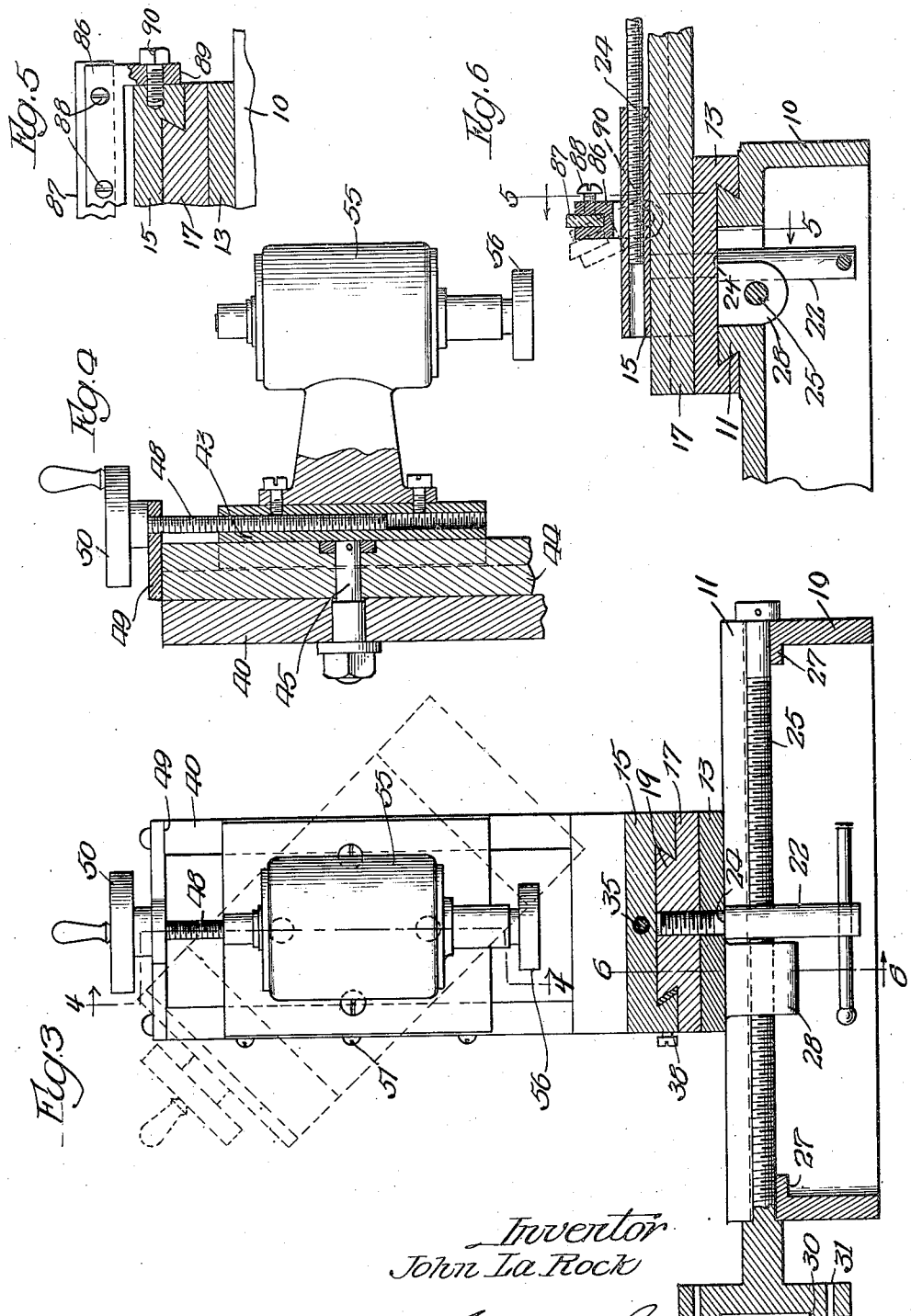

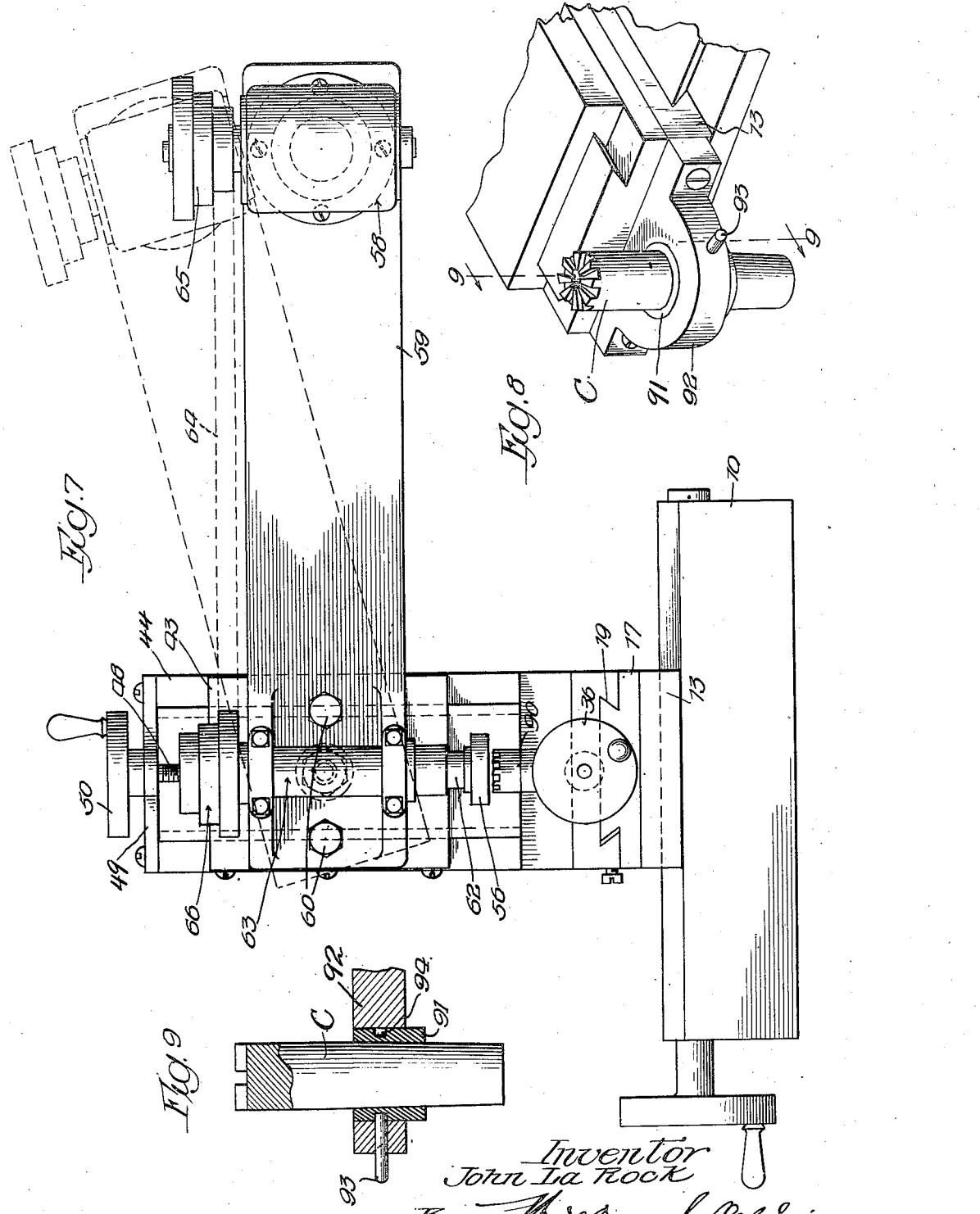

JOHN LA ROCK, OF CHICAGO, ILLINOIS.

MACHINE TOOL.

1,420,323.

Specification of Letters Patent. Patented June 20, 1922.

Application filed December 17, 1918. Serial No. 267,217.

*To all whom it may concern:*

Be it known that I, JOHN LA ROCK, a citizen of the United States, and a resident of Chicago, in the county of Cook and State of Illinois, have invented certain new and useful Improvements in Machine Tools; and I do hereby declare that the following is a full, clear, and exact description thereof, reference being had to the accompanying drawings, and to the characters of reference marked thereon, which form a part of this specification.

This invention relates to a novel universal multi-work machine tool and refers more specifically to a construction and arrangement of the elements of the machine by which the operating tool or tools and the work can be supported in such a way as to be almost universally adjustable relatively to each other, so as to enable the machine to be set or adjusted for doing a large variety of work, such as is usually done on separate machines specially designed for particular kinds of work and also to permit progressive adjustments when the machine is in operation to enable the tool or tools to operate progressively on irregular work.

The invention has been designed more particularly for a moderately small machine tool suitable for use in small shops, although the construction may be embraced in larger machine tools.

In the drawings are shown a number of modifications, illustrating a few of the many adaptations of the machine to works of different kinds and illustrating also different working or cutting tools and attachments which may be employed with the machine tool.

As shown in said drawings:

Figure 1 is a side elevation of a machine tool embodying my invention.

Figure 2 is a top plan view thereof.

Figure 3 is a section on the line 3—3 of Figure 2.

Figure 4 is a detail section on the line 4—4 of Figure 3.

Figure 5 is a detail section on the line 5—5 of Figure 6.

Figure 6 is a fragmentary detail on the line 6—6 of Figure 3, showing a special form of holder.

Figure 7 is a rear elevation showing a modified structure.

Figures 8 and 9 are details illustrating the manner of supporting an end cutting tool to be sharpened.

Figure 10 illustrates the adaptation of a drill as the cutting tool of the machine.

The base 10 of the machine which, as herein shown, is rectangular, comprises a flanged casting which is provided on its upper face with two pairs of parallel, transverse ways 11, 12, one pair near each end of the frame. Said ways are undercut in the usual manner to receive and guide correspondingly grooved carriages 13, 14 which are slidable lengthwise of the ways.

Supported on said carriages are two compound slide rests, comprising upper rest members 15, 16 and lower rest members 17, 18; the lower rest members being provided on their upper faces with guide ways 19, 20, respectively, which are disposed longitudinally of the machine to receive and support the undercut grooved upper slide rest members 15 and 16 for movement longitudinally of the machine.

The said compound slide rests are pivotally mounted on the frame by pivot and holding studs 22 (Figures 3 and 6) which are reduced and threaded at their upper ends to extend loosely through the carriages 13 and 14 and are threaded into the lower members 17, 18 of the compound slide rests. The said pivot studs constitute centers about which both the slide rests may swing horizontally so as to vary the angles of presentation of the work to the cutting tool and the tool to the work. The compound slide rests are locked from turning on the carriages through the coaction of the shoulders 24 on the locking studs 22, and the threads at the reduced ends of the studs, to thereby enable the compound slide rests to be fixed rigidly in place after an adjustment. Said studs are provided with cross-bars by which to rotate them, and it will be noted that the lower ends of the studs and their cross-bars have free clearance in the open space beneath the machine base so that they can be quickly grasped for turning them, and it will also be observed that all that is required to lock and unlock the slide rests comprises, for each slide rest, a single element.

The said carriages 13 and 14, carrying the compound slide rests, are adapted to be moved transversely of the machine frame, and relatively to each other, by means of screw shafts 25 that are rotatably mounted at their ends in bearings 27 on the base casting (Figure 3) and engage threaded openings in downwardly extending lugs or travellers 28 rigid with or fixed to the carriages 13 and 14. The said screw shafts may be locked in place in any suitable manner to hold the carriages and their compound slide rests in their laterally adjusted positions. As herein shown, the shafts are provided at one side of the machine with crank discs 30, by which they may be turned. Said discs are provided with a plurality of holes 31 arranged in a series concentric to the axes of rotation of the shafts and in position to be separately engaged by spring pressed locking pawls 32 mounted in brackets 33 at the sides of the base.

The upper members 15 and 16 of the compound slide rests are adapted also to traverse the lower members 17, 18 thereof through the action of screw shafts 35 that are provided at their ends with crank discs 36 and have rotative bearing in brackets 37 carried by the lower members of the compound slide rests. The inner or proximate ends of said shafts engage screw threaded openings in the upper members 15, 16 of the compound slide rests (Figure 3). With this construction, said slide rests may be independently moved toward and from each other so as to adjust the work to the tool and vice versa. Locking means, such as are associated with the crank discs 30 of the screw shafts 25 may be employed to lock the shafts 35 from turning after being adjusted. If desired, the screws 38, shown in Figures 1 and 3, may be employed for locking the member 15.

Supported on the upper member 16 of one of the slide rests is a column 40 having a base 41 which rests upon and is bolted to said upper member 16. The said column supports on its vertical face a compound slide rest, comprising the members 43, 44. The member 44 fits flat against the column face and is pivotally supported on the column through the medium of a screw pivot and locking stud 45 (Figure 1) and the member 43 is slidably supported on the member 44. For this purpose the member 44 is formed with an undercut way 46 (Figure 2) over which engages the complemental grooved portion of the member 43 of said column slide rest.

The sliding member 43 of the column slide rest is caused to vertically traverse the pivotal member 44 through the action of a vertical screw shaft 48 that is rotatably mounted in a bracket 49 of the member 44 and engages a screw threaded opening in the slide rest member 43 (Figure 4). Said shaft is provided with a crank disc 50 by which to turn it, and it may be locked in place in the same manner as are the crank discs 30 of the screw shafts 25 or by the screws 51 shown in Figure 1. In the arrangement shown in Figures 1 and 2, the column compound slide rest supports a motor 55, the armature shaft of which is adapted to carry at its lower end a tool, such as the grinding tool 56 shown in Figure 1, the drill 57 shown in Figure 13, or other operating tool.

In the construction shown in Figure 7, the motor 58 therein employed is supported on an elongated mounting plate 59 which is bolted at 60 to the sliding member 43 of the compound column slide rest. Said motor is adapted to be connected to a tool shaft 62, mounted in a bearing 63 that is rigid with said plate, through the medium of a belt 64 that is trained about a cone pulley 65 on the armature shaft of the motor and a corresponding cone pulley 66 on the tool carrying spindle 62.

The manner of pivotally mounting the column and work holding slide rests enables either of said slide rests to be angularly adjusted about its pivot stud, as, for instance, in the manner indicated in full and dotted lines in Figure 2, the range of adjustment being through a large part of 180 degrees of an arc. The adjusting screws 25 and 35 permit the work and column slide rests to be moved towards and from each other transversely of the base, either independently or simultaneously, and these parts, while they can serve as locking means to permanently lock the slide rests can also be adjusted by their screw thread formation during the operation of the machine.

Moreover, the motor or the tool spindle, as the case may be, is capable of a similar swinging adjustment in a vertical plane, as well also as a bodily vertical adjustment. The combined swinging and sliding adjustments of the various compound slide rests give a very large variety of possible adjustments of the tool to the work or the work to the tool, and for presenting the tool to the work at a desired angle when the adjustable parts are fixed, as when grinding. Moreover, by reason of the fact that the adjustable parts are capable of being moved relatively to each other during the operation of the cutting tool, it will be observed that the work may be caused to travel relatively to the tool or the tool to the work both longitudinally and transversely in a manner to cut or grind both straight and irregularly curved surfaces.

The swinging movement of the motor or the tool spindle is also important inasmuch as it gives a wide variety of presentation of such a tool, as the grinder 56, for instance, to work supported on the work holding slide rest. For instance, in Figures 1 and 2 is shown a work mounting by which a toothed cutting tool may be ground. Said mounting consists of a rail 70, shown as slotted, for the purpose of lightening the same, and which may be attached to the upper member of the slide rest 15 in any suitable manner. The said rail 70 is grooved at its sides to receive the guide lugs 73 of upstanding brackets 75 which carry centers 76 to engage corresponding centers in the ends of the spirally toothed cutting tool 77, as shown in Figures 1 and 2. The said tool may be locked from rotation when held between centers 76 by means of a locking dog or pawl 78 that is seated in a socket member 79 which is carried by the upper rail 82 of a bracket 80 that is attached to and rises from the rear end of the base. The said pawl 78 may be locked in the socket 79 by the set screw 81. The socket member 79 is also adapted to be laterally adjusted relatively to the upper rail of the bracket by providing said rail 82 with a slot or slots 83 through which, and the base flange of the socket member 79, extend fastening bolts 84.

With the tool 77 locked between the centers in the manner shown in Figures 1 and 2, the teeth of the tool may be ground at the proper angles by movement of the work towards the tool or the tool towards the work, and the spiral teeth of the cutter may be followed by a simultaneous movement of the carriage 14 laterally of the machine and the upper member 16 of the column compound slide rest towards and from the work.

In Figures 5 and 6 is shown a holder 86 that is adapted to be supported transversely of the upper member of the work slide rest to hold a straight blade 87 in position to be bevel-ground by the tool 56. The said holder is slotted to receive the blade 87, which latter may be held in place by the set screws 88. Said holder is provided at its ends with downturned lugs 89 which overlap the vertical faces of the upper member of the work slide rest and is pivotally connected thereto by the screw bolts 90. By releasing or backing off said bolts the holder may be swung about the bolt axes to adjust it to any permissible angular position desired, as indicated in Figure 6; and when said bolts are screwed home the holder is held in adjusted position.

In Figures 7, 8, and 9 is illustrated the manner of holding and presenting a grinding tool to the end teeth of a cutter C, which end teeth are to be ground at the beveled angles shown in Figures 7 and 8. The tool C, which is a tapered tool, is fitted in a bushing 91 that is locked in a bracket 92, which is detachably fastened to the carriage 13, as by means of a locking pin or stud 93 adapted to separately engage at its inner end angularly spaced sockets 94 which angularly correspond to the radial teeth of the tool 90. It will be observed that, by swinging the tool spindle in the manner indicated in dotted lines in Figure 7, if the mounting shown in said Figure 7 be employed, or the motor 55, if the mounting shown in Figure 1 be employed, the lower face of the grinding disc 56 may be presented at the proper angle to grind said teeth, and said disc may be moved along the faces of the teeth when grinding either by bodily movement of the work compound slide rest or the column compound slide rest, and backed away from the tool being ground after the grinding of each tooth has been finished.

In the use of the drill as the particular cutting tool with the construction suggested in Figures 1 to 7 inclusive, it will be observed that the adjustments of the various compound slide rests gives a very wide range of possible direction of drilling to the work supported on the work slide rest, as well also as ability to drill spaced holes in the work either laterally or longitudinally of the machine.

The several suggested uses of the machine and adjustments obviously comprises but a few of many readily applied adjustments that may be employed for different kinds of cutting, grinding, and drilling work, so that the said machine tool, having the relatively adjustable and movable work, column, and tool slide rests becomes the basis or foundation of what may be termed a universal machine tool.

I claim as my invention,—

1. A universal, multi-work machine tool comprising a base, a work rest, a column supported on said base, a compound slide rest supported on said column, embracing members which have, respectively, vertically slidable and vertically swingable adjustment relatively to the column, means to lock the vertically slidable member constructed to permit it to be raised and lowered during the operation of the machine, and a motor mounted on the vertically slidable member of said rest.

2. A universal multi-machine tool comprising a base, a compound slide rest thereon embracing members which have respectively horizontal and transverse movement on the base, screw thread locking means for said members constructed to fixedly lock said members and to permit adjustment thereof during the operation of the machine, a second compound slide rest on the base embracing members capable of movement in relatively transverse directions and of horizontal swingable adjustment relatively to the frame, with means to lock them in adjustment, a column supported on said latter slide rest, means to support an operating tool on said column, embracing means to vertically lock said tool by means permitting vertical adjustment during the operation of the machine, and means to angularly adjust and lock said tool in angular adjustment.

3. A universal, multi-work machine tool comprising a base, a work rest embracing members capable of longitudinal and transverse adjustment on the base and also horizontally swingable, a compound slide rest on the base embracing members that are transversely and longitudinally slidable, the latter towards said work rest, and also swingably adjustable relatively to the base, with means to lock them in adjustment, a column supported on said slide rest, and an operating tool compound slide rest supported on said column embracing a member capable of angular adjustment in a vertical plane and a vertically adjustable slide thereon, with means to lock said latter member in adjustment on said column while permitting it to be vertically adjustable during the operation of a tool supported thereon.

4. A machine tool comprising a base, a work rest, a column, a support for a column resting on said base, separate means to effect independent and simultaneous longitudinal and transverse adjustments of said work rest and column support on the base, other means to permit horizontal swinging adjustment of said supports relatively to each other and to the base, and a tool support mounted on said column.

5. A machine tool comprising a base, a work rest, a column, a support for the column resting on said base, separate means to effect independent and simultaneous longitudinal and transverse adjustments of said work rest and column support on the base, other means to permit horizontal swinging adjustment of said supports relatively to each other and to the base, a tool support mounted on said column, and separate means to effect both vertical and angular adjustments of the tool support relatively to said column.

6. A machine tool comprising a base, a slide rest to support the work, embracing a horizontally swingable base member and a longitudinally slidable top member, a column slide rest comprising like swingable and slidable members, a column supported on the slidable member of the latter rest, and an operating tool support carried by said column.

7. A machine tool comprising a base, a slide rest to support the work embracing a horizontally swingable base member and a slidable top member, a column slide rest comprising like swingable and slidable members, a column supported on the slidable member of the latter rest, and a cutting tool supporting means carried by the column, embracing means to vertically and angularly adjust an operating tool in a vertical plane.

8. A machine tool comprising a base, a slide rest to support the work embracing a horizontally swingable base member and a slidable top member, a column slide rest comprising like swingable and slidable members, a column supported on the slidable member of the latter rest, and an operating tool slide rest embracing a member pivotally supported on the column and a member slidable on the pivotal member.

9. A machine tool comprising a base, parallel transverse rails thereon, parallel carriages supported on the base and guided by said rails, with means to slide said carriages on the base, a work holding compound slide rest supported on one of the carriages embracing a member which is pivoted to said carriage to swing horizontally and a second member slidable on the pivoted member, a second compound slide rest having like pivotal and sliding parts supported on the other carriage, a column supported on said second slide rest, and a tool support carried by said column.

10. A machine tool comprising a base, parallel transverse rails thereon, parallel carriages supported on the base and guided by said rails, with means to slide said carriages on the base, a work holding compound slide rest supported on one of the carriages embracing a member which is pivoted to said carriage to swing horizontally and a second member slidable on the pivoted member, a second compound slide rest having like pivotal and sliding parts supported on the other carriage, a column supported on said second slide rest, and a tool supporting means carried by said column, embracing means whereby a tool may be swung in a vertical plane to adjust it to the work.

11. A machine tool comprising a base, a pair of compound slide rests to support a tool and the work, and comprising a lower longitudinally slidable and horizontally swingable member and an upper transversely slidable member, separate means to actuate said members, and locking means to hold the sliding and swingable members in positions of adjustment.

12. A machine tool comprising a base, parallel transverse rails thereon, parallel carriages supported on the base and guided by said rails, with means to slide said carriages on the base, a work holding compound slide rest supported on one of the carriages embracing a member which is pivoted to said carriage to swing horizontally and a second member slidable on the pivoted member, a second compound slide rest having like pivotal and sliding parts supported on the other carriage, a column supported on said second slide rest, and an operating tool supporting compound slide rest carried by the column embracing a member which is pivoted to the column to swing vertically, and a sliding member thereon to which an operating tool is adapted to be directly attached.

13. A machine tool comprising a base, a work support, a carriage slidable on said base towards and from the work support, a member pivoted to swing horizontally on said carriage, a tool supporting member slidable longitudinally on said swingable member, and separate means to actuate said slidable member and to lock said swinging member.

14. A machine tool comprising a base, a work support comprising centers to sustain the work, while permitting the work to rotate relatively thereto, locking means fixed to the base to hold the work from rotation, and a compound tool rest embracing a horizontally swinging member having means to move it transversely of the work support, and a tool support slidable longitudinally on said swinging member.

15. A machine tool comprising a base, a work support, a carriage slidable on said base, a member pivoted to swing horizontally on said carriage, a tool supporting member slidable longitudinally on said swingable member, work centers on said work support to rotatively support the work, and locking means for the work comprising a part rigid with the base, and a locking member carried thereby for contact with the work.

16. A machine tool comprising a base, a work support having means to sustain the work transversely across said support, a carriage movable on the base towards and from said work support, and a compound tool rest embracing a member pivoted to swing horizontally on said carriage, and a tool supporting member slidable longitudinally of said swinging member.

17. A machine tool comprising a base, parallel transverse rails thereon, parallel carriages supported on the base and guided by said rails, with means to slide said carriages on the base, a work holding compound slide rest supported on one of the carriages embracing a member which is pivoted to said carriage to swing horizontally and a second member slidable on the pivoted member, a second compound slide rest having like pivotal and sliding parts supported on the other carriage, a column supported on said second slide rest, and a pivotal and sliding member supported on the column to, in turn, support an operating tool.

18. A universal, multi-work machine tool comprising a base constructed with a lower hollow formation, a compound work supporting slide rest embracing a longitudinally slidable member and a horizontally swingable member, a threaded stud for locking said members in different adjustments relatively to the base with the hand engageable portion thereof in the hollow formation of the base, and a tool supporting slide rest comprising like swingable and slidable members and provided with a like threaded stud to lock them in adjusted positions relative to the frame.

In testimony that I claim the foregoing as my invention I affix my signature this 9th day of December, A. D. 1918.

JOHN LA ROCK.